United States Patent
Son

[19]

[11] Patent Number: 6,154,430
[45] Date of Patent: Nov. 28, 2000

[54] DISK PLAYER WITH CHUCK HOLDER CAPABLE OF PIVOTING UPWARD AND DOWNWARD

[75] Inventor: Byung-sam Son, Suwon, Rep. of Korea

[73] Assignee: Samsung Electronics Co., Ltd., Rep. of Korea

[21] Appl. No.: 08/997,665

[22] Filed: Dec. 23, 1997

[30]      Foreign Application Priority Data

Dec. 31, 1996 [KR] Rep. of Korea ...................... 96-80117

[51] Int. Cl.⁷ ................................................ G11B 33/02
[52] U.S. Cl. ............................................................ 369/75.2
[58] Field of Search ................................ 369/75.1–75.2, 369/77.1–77.2

[56]            References Cited

U.S. PATENT DOCUMENTS

| | | | |
|---|---|---|---|
| 5,327,412 | 7/1994 | Lee | 369/75.2 |
| 5,590,113 | 12/1996 | Choi | 369/270 |
| 5,615,197 | 3/1997 | Choi | 369/77.2 |
| 5,867,338 | 2/1999 | Ohira et al. | 369/75.2 |

*Primary Examiner*—Allen T. Cao
*Attorney, Agent, or Firm*—Dilworth & Barrese

[57]            ABSTRACT

A disk player having a housing provided with a loading motor and a loading gear rotating by the loading motor, a disk tray for conveying a disk into and out of the housing and having a rack which is installed to enable a relative movement with respect to the disk tray in insertion or ejection directions by being engaged with the loading gear, a chuck for pressing down on the upper surface of the disk conveyed inside the housing by the disk tray, a chuck holder having one end combined with the chuck and the other end hinge-combined with the housing to pivot upward and downward, an assembly for locking the rack with respect to the disk tray while the disk tray moves into or out of the housing, an assembly for releasing the rack from a locked state to allow the rack to make a relative movement with respect to the disk tray after the disk tray is inserted into the housing, and an assembly for lifting or lowering the chuck holder to pivot upward and downward by being interlocked with the rack moving with respect to the disk tray.

12 Claims, 7 Drawing Sheets

DISK PLAYER WITH CHUCK HOLDER CAPABLE OF PIVOTING UPWARD AND DOWNWARD

BACKGROUND OF THE INVENTION

1. Field of the Invention

The present invention relates to a disk player, and more particularly, to a disk player having an improved structure in which a holder pivots upward and downward for supporting a chuck for pressing down on the upper surface of a disk.

2. Description of Related Art

A typical disk player includes a housing and a disk tray which conveys a disk into and out of the housing. The housing is provided with an optical pickup unit, a turntable on which the disk is placed, a chuck installed over the turntable to fix the disk on the turntable by pressing down on the upper surface thereof, a chuck holder for supporting the chuck, and a spindle motor for rotating the turntable. The disk is transported between the turntable and the chuck by the disk tray. When the chuck approaches the turntable or the turntable approaches the chuck, the upper and lower surfaces of the disk are pressed between the chuck and the turntable, respectively, and thereby fixed on the turntable.

Meanwhile, in a disk player where the chuck approaches the turntable to press down on the upper surface of the disk, a chuck holder is provided to enable pivoting of the chuck in upward and downward directions, and a chuck is provided on the free end of the chuck holder. Thus, the chuck approaches or separates from the turntable depending on the upward or downward pivot of the chuck holder.

However, in the conventional disk player having a chuck holder capable of pivoting upward and downward as described above, the chuck holder is lifted or lowered by a complicated mechanism having many components. Therefore, the manufacturing costs are high, and the assembly process is very complicated.

SUMMARY OF THE INVENTION

To solve the above problems, an object of the present invention is to provide a disk player having an improved mechanism for driving a chuck holder which supports a chuck for pressing down on the upper surface of a disk.

To accomplish the above object, there is provided a disk player comprising a housing provided with a loading motor and a loading gear which is rotated by the loading motor; a disk tray for conveying a disk into and out of the housing and having a rack which is installed to enable a relative movement with respect to the disk tray in insertion or ejection directions by being engaged with the loading gear; a chuck for pressing down on the upper surface of the disk conveyed inside the housing by the disk tray; a chuck holder having one end associated with the chuck and the other end hinged to the housing to pivot upward and downward; means for locking the rack with respect to the disk tray while the disk tray moves into or out of the housing; means for releasing the rack from a locked state to allow the rack to move relatively to the disk tray after the disk tray is inserted into the housing; and means for lifting or lowering the chuck holder to pivot upward and downward by being interlocked with the rack moving with respect to the disk tray.

BRIEF DESCRIPTION OF THE DRAWINGS

The above object and advantage of the present invention will become more apparent by describing in detail a preferred embodiment thereof with reference to the attached drawings in which.

DETAILED DESCRIPTION OF THE INVENTION

Figure 1:
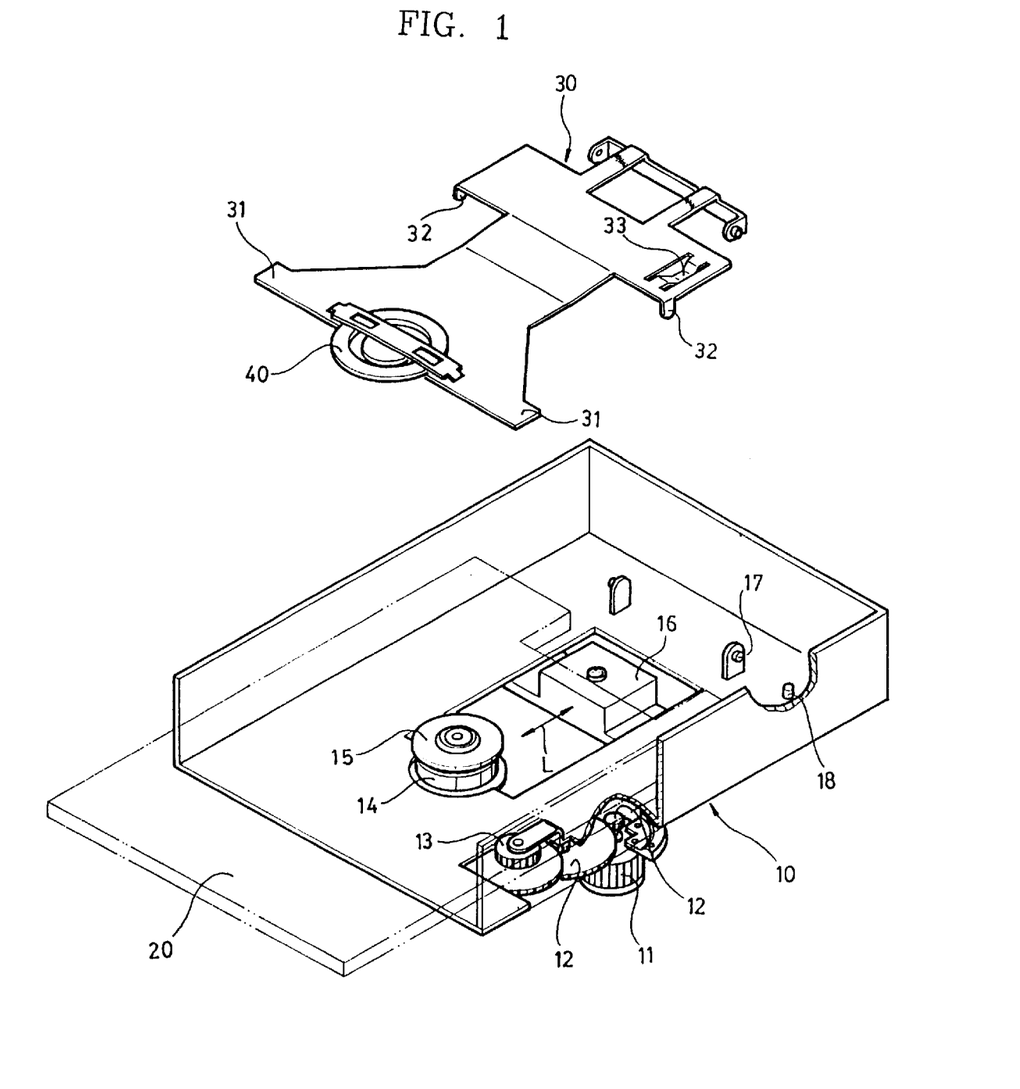
FIG. 1 is a partially exploded perspective view of a disk player according to an embodiment of the present invention.
Figure 2:
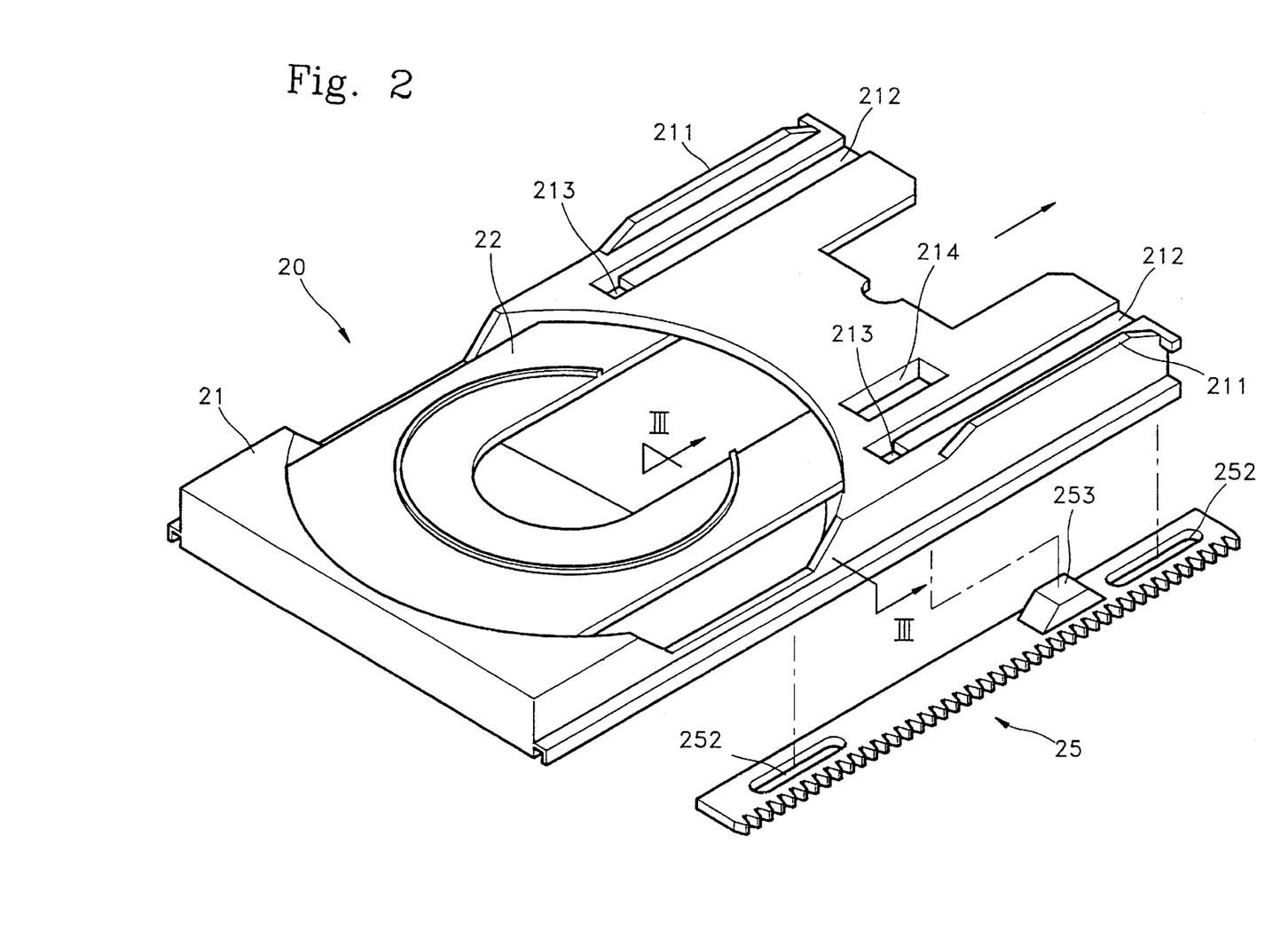
FIG. 2 is a schematic perspective view of the disk tray shown in FIG. 1.

As shown in FIGS. 1 and 2, a disk player according to the present invention includes a housing 10 and a disk tray 20 for transporting a disk into and out of the housing 10.

The housing 10 is provided with a loading motor 11, a spindle motor 14, a loading gear 13, an optical pickup unit 16 and a chuck holder 30. The loading gear 13 is rotated by the rotational force transmitted from the loading motor 11 via connecting gears 12. A turntable 15, on which a disk is placed, is fixed on the output shaft of the spindle motor 14. The optical pickup unit 16 is installed to be capable of sliding in the direction indicated by arrow L by a driving source (not shown). One end of the chuck holder 30 is pivotally connected to a hinge protrusion 17 provided on the housing 10. A chuck 40 is positioned at the free end of the chuck holder 30. The chuck 40 presses down on the upper surface of a disk loaded on the turntable 15 to secure the disk to the turntable 15. A pair of guide pieces 31 and a pair of guide protrusions 32 are provided on the chuck holder 30. Also, the chuck holder 30 includes a bent recess piece or engagement protrusion 33 which protrudes downward.

Figure 3:
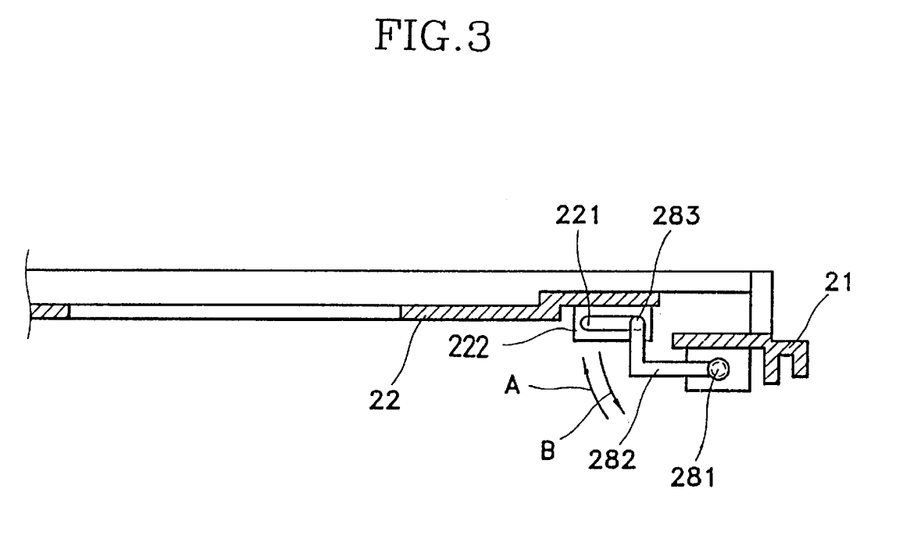
FIG. 3 is a schematic sectional view taken along line III—III of FIG. 2.

The disk tray 20 includes a tray main body 21, and a disk receiving member 22 at the center of the tray main body 21 which is capable of moving up and down with respect to the tray main body 21. A slotted member 222 having a slot 221 protrudes from the bottom surface of the disk receiving member 22 as shown in FIG. 3. A protrusion 283 formed at the leading end of a pivot lever 282 is slidingly coupled to the slot 221. The pivot lever 282 is connected to the tray main body 21 enabling pivoting around a shaft 281. Accordingly, as the pivot lever 282 pivots in one of the directions indicated by arrows A and B, the disk receiving member 22 is lifted or lowered. The pivot lever 282 is elastically biased in a clockwise direction by a spring (not shown) such that the disk receiving member 22 can be kept lifted.

The tray main body 21 is provided with a pair of guide rails 211, and a pair of guide grooves 212 formed to be parallel to the guide rails 211. A through-hole 213 is formed on the inner end of each of the guide grooves 212. An inserting hole 214 is also formed in the tray main body 21.

Figure 4:
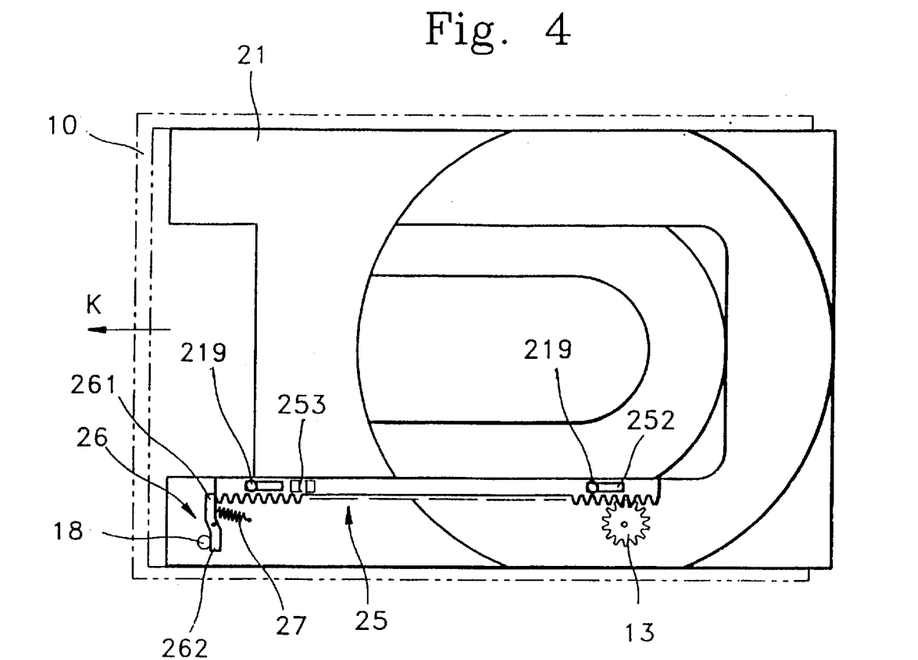
FIGS. 4 and 5 are schematic bottom surface views of portions of the disk tray shown in FIG. 3, which show the rack in locked and unlocked states, respectively.

A rack 25 engaged with the loading gear 13 is connected to the bottom surface of the tray main body 21. Also, a guide slot 252 is formed on the rack 25. As shown in FIG. 4, the rack 25 can be slidingly connected to the tray main body 21 by inserting a protrusion 219 formed on the bottom surface of the tray main body 21 into the guide slot 252.

As shown in FIG. 4, a lever member 26 for locking the rack 25 to the disk tray 20 when the disk tray 20 enters or leaves the housing 10, is pivotally installed on one side of the bottom surface of the tray main body 21. The lever member 26 is elastically biased by a spring 27 so that one end thereof can press against the rack 25 in a direction opposite to the insertion direction of the disk tray indicated by arrow K.

Figure 5:
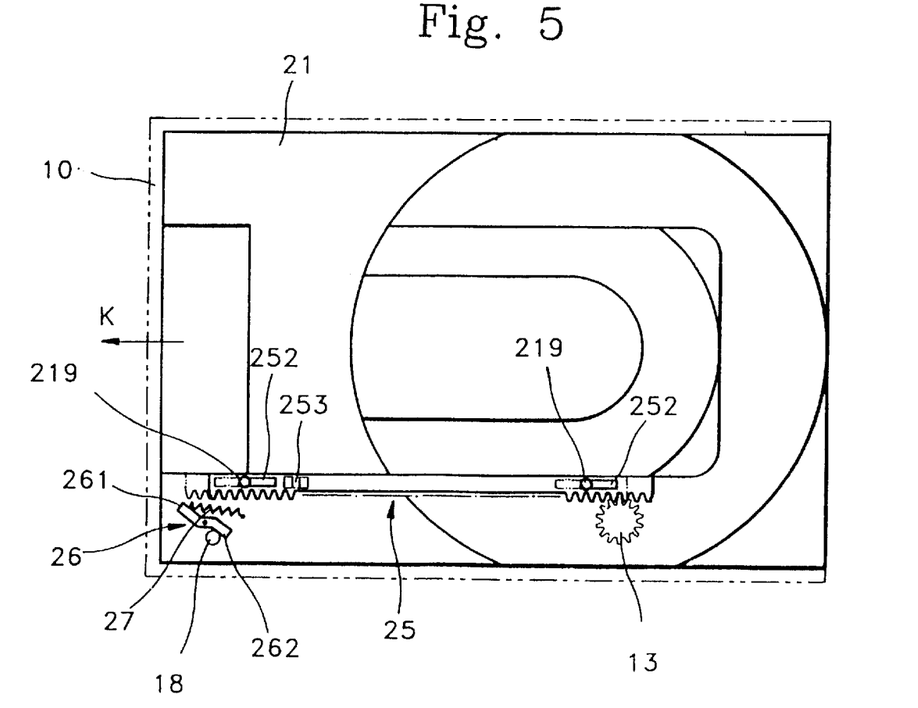

A pressing portion or abutment member 18 is formed on the housing 10 to release the rack 25 from a locked state. The pressing portion 18 contacts an opposite end 262 of the lever member 26. As shown in FIG. 5, when the disk tray 20 is completely inserted, the opposite end 262 of the lever member 26 is pushed by the pressing portion 18 of the housing 10, so that the lever member 26 pivots. Accordingly, the end 261 of the lever member 26 loses contact with the rack 25 to thereby release the rack 25 from a locked state. Then, the rack 25 can move in the insertion direction K of the disk tray 20.

Also, the disk player includes a means for lifting and lowering the chuck holder 30 in conjunction with the relative movement of the rack 25 with respect to the disk tray 20. In the present embodiment, the lifting and lowering means includes an interlocking protrusion 253 formed on the upper surface of the rack 25 and the bent recess piece 33 (see FIG. 1) formed on the chuck holder 30. The interlocking protrusion 253 passes through the insertion hole 214 of the tray main body 21, and supports the bent recess piece 33 of the chuck holder 30 when the disk tray 20 is completely inserted into the housing 10.

Figure 6:
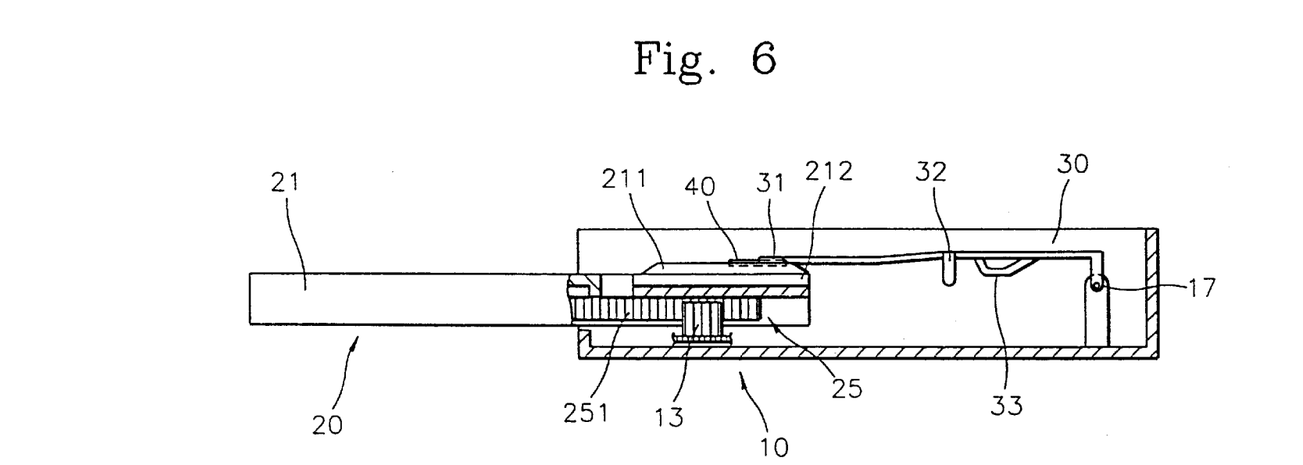
FIGS. 6 through 8 are schematic sectional views for sequentially showing the process of inserting a disk tray into a housing shown in FIG. 1.
Figure 7:
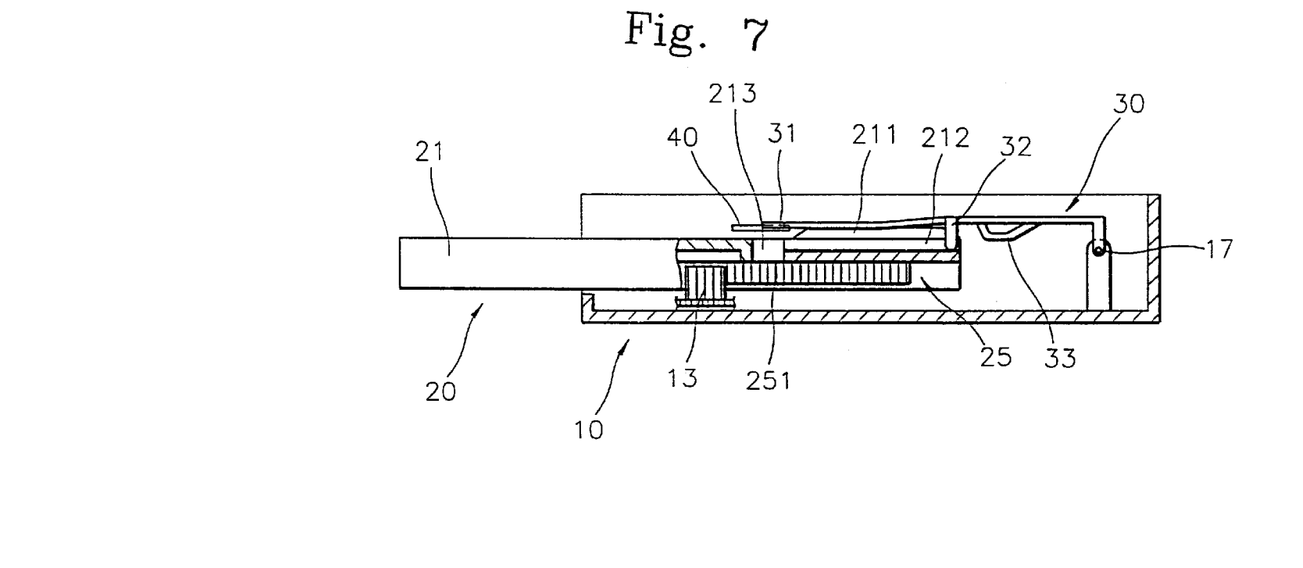

In the disk player having such a configuration, when the loading motor 11 is operated after a disk is placed on the disk receiving member 22 of the disk tray 20, a rotational force is transmitted to the loading gear 13 via the connecting gears 12 to rotate the loading gear 13. Accordingly, the rack 25 interlocked with the loading gear 13 moves toward the housing 10. Since the rack 25 is fixed on the tray main body 21 as shown in FIG. 4, the tray main body 21 is also inserted into the housing together with the rack 25. As the disk tray 20 is inserted into the housing 10, guide pieces 31 of the chuck holder 30 maintain a lifted state by being supported by the upper surface of the guide rails 211 formed on the tray main body 21 as shown in FIG. 6. As the rack 25 and the tray main body 21 continues to move into the housing 10 by the continuous rotation of the loading motor 11, the guide pieces 31 of the chuck holder 30 pass by the guide rails 211 of the disk tray 20 as shown in FIG. 7. Before this, both guide protrusions 32 of the chuck holder 30 contact the bottom surface of the guide grooves 212 of the tray main body 21. Accordingly, the chuck holder 30 is maintained in a lifted state. That is, while the disk tray 20 is being inserted, the chuck holder 30 is supported by the disk tray 20 in a lifted state in which chuck 40 is spaced from turntable 15.

Figure 8:
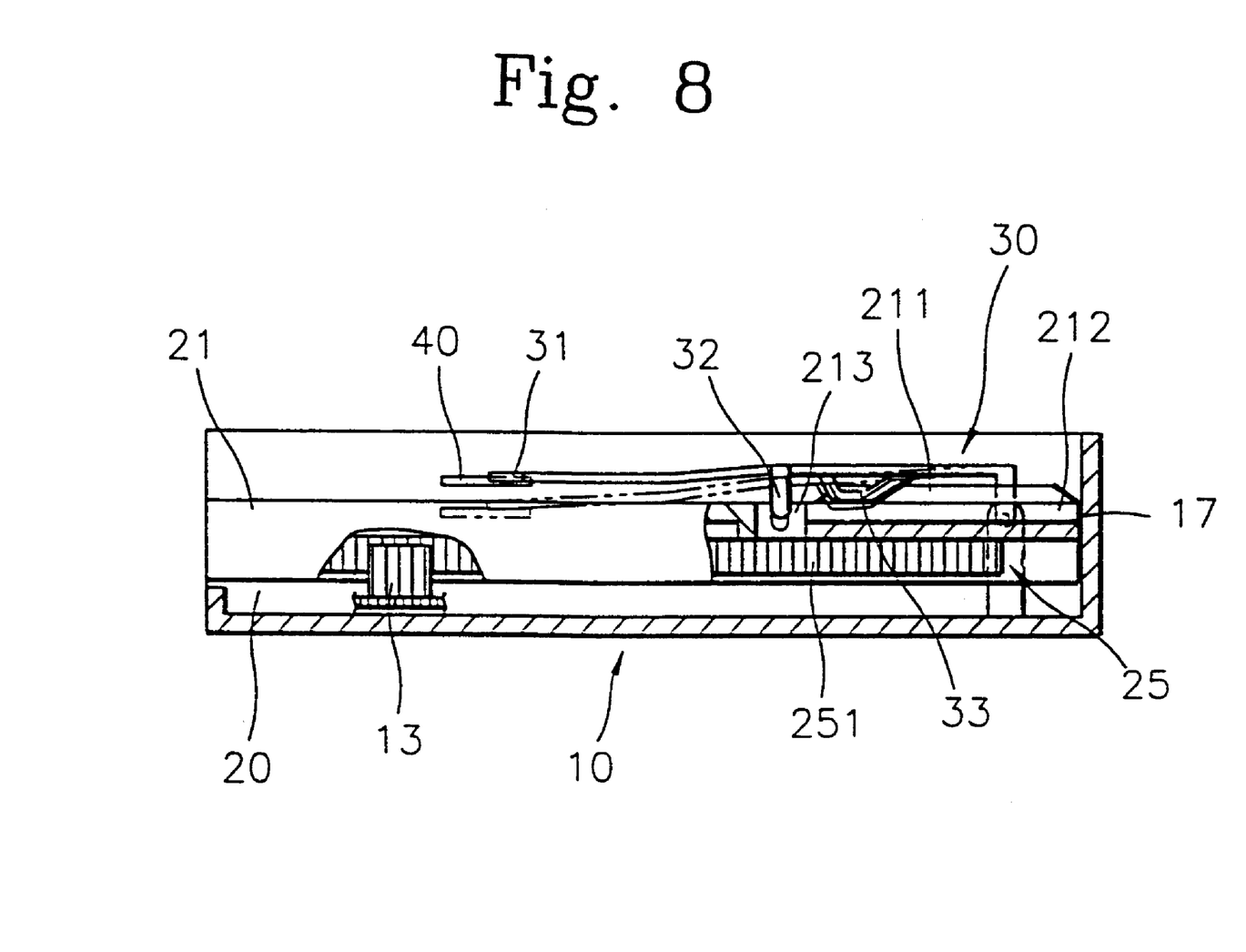
Figure 9:
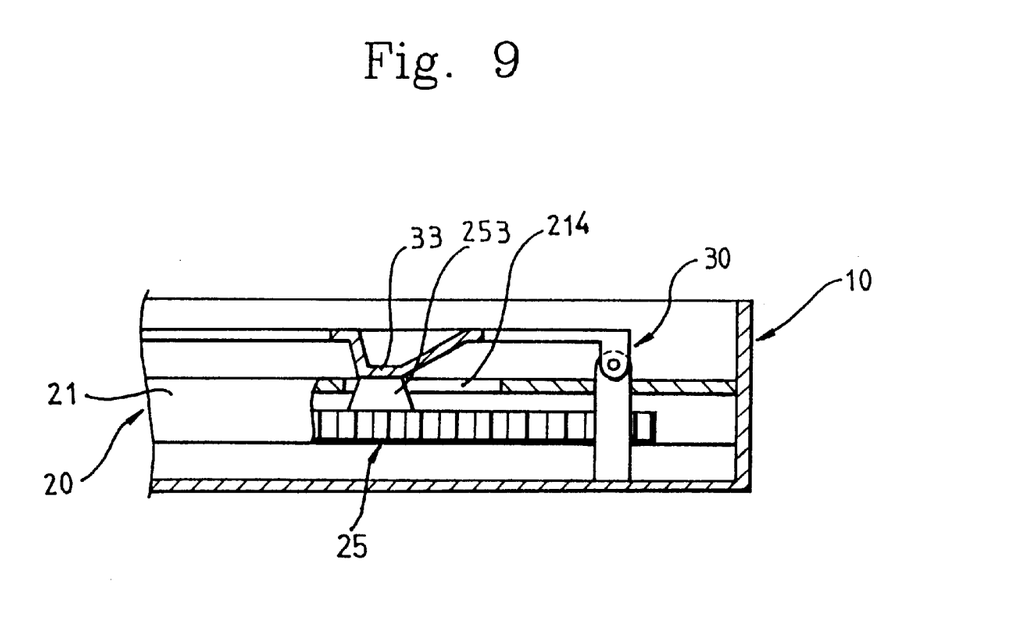
FIG. 9 is a schematic sectional view showing a chuck holder in a state in which the disk tray is completely inserted.

Meanwhile, when the disk tray 20 is completely inserted into the housing 10, a disk (not shown) on the disk receiving member 20 is located directly over the turntable 15. At the same time, the guide protrusion 32 of the chuck holder 30 is separated from the bottom surface of the guide groove 212, and is located over the through-hole 213 of the tray main body 21, as shown in FIG. 8. However, the chuck holder 30 continues to be lifted, since the bent recess piece 33 is supported on the upper surface of the interlocking protrusion 253 which protrudes through the insertion hole 214 of the tray main body 21, as shown in FIG. 9.

Meanwhile, when the insertion of the disk tray 20 is almost completed, the lever member 26 of the disk tray 20 proceeding into the housing 10 is pressed by the pressing portion 18 of the housing 10 as shown in FIG. 5. Thus, the lever member 26 pivots to thereby release the rack 25 fixed on the tray main body 21 from its locked state.

In such a state, as the loading motor 11 operates continuously, the rack 25, interlocked with the loading gear 13, proceeds with respect to the disk tray 20 in the insertion direction indicated by arrow K as shown in the imaginary line of FIG. 5.

Figure 10:
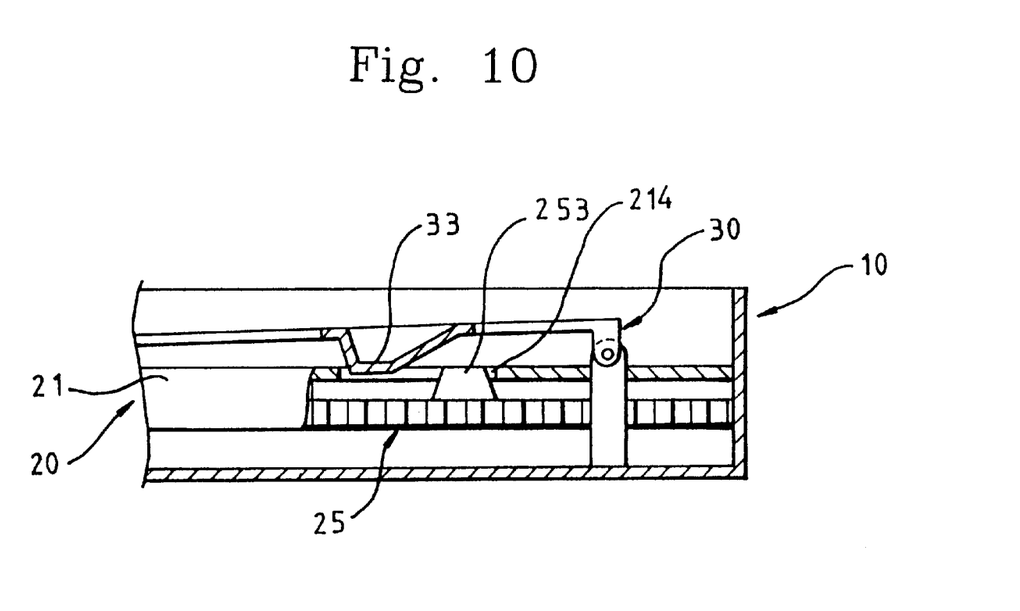
FIG. 10 is a schematic sectional view showing a rack which is moved with respect to the disk tray.

At this time, since the rack 25 moves forward with the disk tray 20 fixed as above, the interlocking protrusion 253 having supported the bent recess piece 33 of the chuck holder 30, also moves forward and gets out of under the bent recess piece 33 as shown in FIG. 10. Therefore, the chuck holder 30 is lowered by the force of its own weight as shown by the imaginary line of FIG. 8. At this time, the guide protrusion 32 presses down on one end of the pivot lever 282 (see FIG. 3) by being inserted into the through-hole 213 of the tray main body 21, thereby rotating the pivot lever 282 in a direction indicated by arrow B. Accordingly, the disk receiving member 22 combined with the front end of the pivot lever 282 is lowered. During lowering of the disk receiving member 22, the disk on the disk receiving member 22 is placed on the turntable 15. At the same time, the disk on the turntable 15 is pressed by the chuck 40 being lowered according to the downward pivot of the chuck holder 30, so that the disk is fixed on the turntable 15.

When the spindle motor 14 operates in such a state, the turntable 15 fixed on the output shaft of the spindle motor 14 rotates with the chuck 40 and the disk fixed on the turntable 15. Then, the optical pickup unit 16 reads information from the disk.

Meanwhile, in order to eject a disk, the loading motor 11 is rotated in a direction reverse to that for inserting the disk tray 20. Then, the loading gear 13 rotates reversely, so that the rack 25 is moved with respect to the disk tray 20 in an ejection direction of the disk tray 20. The interlocking protrusion 253 formed on the upper surface of the rack 25 is again moved to the position as shown in FIG. 9 during the movement of the rack 25, such that the chuck holder 30 is pivoted upward while the bent recess piece 33 contacts the interlocking protrusion 253. When the chuck holder 30 pivots upward, the chuck 40 is lifted away from the disk, and the pivot lever 282, having been pressed by the guide protrusion 32 of the chuck holder 30, pivots upward by the restoring force of the biasing means (not shown). Accordingly, the disk receiving member 22 lifts the disk from the turntable 15 while moving upward.

During the above process, the protrusion 219 of the tray main body 21 is caught in the end of the guide slot 252 of the rack 25, so that the relative movement of the rack 25 with respect to the disk tray 20 is completed. Thereafter, the loading gear 13 is continuously rotated by the loading motor 11 to transfer the rack 25 and the disk tray 20 out of the housing 10. While the rack 25 and the disk tray 20 are moved as above, the lever member 26 is rotated so that the end 261 can again press against the rack 25 by the restoring force of the spring 27, as being separated from the pressing portion 18 of the housing 10, whereby the rack 25 is elastically fixed with respect to the disk tray 20.

As described above, in the disk player according to the present invention, the rack 25 of the disk tray 20 interlocked with the loading gear 13 of the housing 10 is installed to be capable of a relative movement of a predetermined distance with respect to the disk tray 20. While the disk tray 20 reciprocates in and out of the housing 10, the rack 25 is relatively fixed on the disk tray 20. When the disk tray 20 is completely inserted, the rack 25 is moved with respect to the disk tray 20. The chuck holder 30 is provided so that it can pivot upward or downward in conjunction with the relative movement of the rack 25. Accordingly, the chuck 40 can be lifted or lowered without a special complicated mechanism. Therefore, since the structure for lifting or lowering the chuck 40 is simple, a cost for components can be saved, and the assembly process is simplified.

The present invention was described with reference to the preferred embodiment described above, but it is not limited to the above-mentioned embodiment.

For example, a guide protrusion having a length greater than the guide protrusion 32 can be provided instead of the guide protrusion 32 and the guide groove 212. In such a case, the chuck holder can maintain a lifted state with only the guide protrusion without the guide groove. Also, guide pieces 31 may be bent downward such that the chuck holder 30 can be kept lifted without the guide rails 211.

What is claimed is:

1. A disk player comprising:
   a housing provided with a loading motor and a loading gear, said loading motor driving said loading gear;
   a disk tray for conveying a disk into and out of said housing and having a rack operatively associated therewith, said rack being engaged with said loading gear to facilitate movement of said disk tray into and out of said housing;
   a chuck positioned to press down on the upper surface of the disk positioned inside said housing by said disk tray;
   a chuck holder having one end operatively associated with said chuck and the other end pivotably connected to said housing to pivot said chuck upward and downward;
   means for locking said rack with respect to said disk tray while said disk tray moves into or out of said housing;
   means for releasing said rack from in a locked state to allow said rack to make a relative movement with respect to said disk tray after said disk tray is inserted into said housing; and
   means for lifting or lowering said chuck holder to pivot upward and downward by being interlocked with said rack moving with respect to said disk tray.

2. The disk player of claim 1, wherein said locking means comprises a lever member which is pivotally installed on said disk tray and an end of which elastically biases said rack in a direction reverse to the insertion direction.

3. The disk player of claim 2, wherein said releasing means comprises a pressing portion formed on said housing and contacting an opposite end of said lever member as said disk tray is inserted into said housing, and
   wherein when said disk tray is completely inserted, said opposite end of said lever member pivots by being pushed by said pressing portion such that said one end of said lever member loses contact with said rack.

4. The disk player of claim 1, wherein said chuck holder is supported by contacting said disk tray to thereby maintain its own lifted state when said disk tray is moving, and loses contact with said disk tray when said disk tray is completely inserted into said housing;
   wherein said lifting and lowering means includes a bent recess piece protruding downward from said chuck holder, and an interlocking protrusion protruding upward from said rack for supporting said bent recess piece when said disk tray is completely inserted; and
   wherein when said rack relatively moves with respect to said disk tray in the insertion direction, said interlocking protrusion is separated from said bent recess piece of said chuck holder to thereby make said chuck holder pivot downward.

5. A disk player comprising:
   a housing having a loading motor and a loading gear positioned therein, the loading motor driving the loading gear;
   a disk tray supported by the housing and being movable from a first position outside of the housing to a second position within the housing;
   a chuck holder having a chuck positioned thereon, the chuck holder being movable from a first position spaced from the disk tray to a second position closer to the disk tray;
   a rack operatively associated with the disk tray and operatively engaged with the loading gear to facilitate movement of the disk tray between the first and second positions;
   a lever member supported on the disk tray, the lever member being movably positioned to lock the rack to the disk tray; and
   at least one guide member formed on one of the disk tray and the chuck holder, the at least one guide member effecting movement of the chuck holder between its first and second positions when the disk tray is moved between its first and second positions.

6. The disk player of claim 5 further including an abutment member positioned on the housing to engage the lever member to release the rack from the disk tray and permit the rack to move relative to the disk tray.

7. The disk player of claim 5, wherein the at least one guide member includes a pair of guide rails positioned on the disk tray and a pair of guide pieces positioned on the chuck holder, the guide pieces being movable along and off of the guide rails during movement of the disk tray from its first to its second position to permit the chuck holder to move from its first to its second position.

8. The disk player of claim 7, wherein the at least one guide member further includes a pair of guide protrusions positioned on the chuck holder and a pair of guide grooves formed in the disk tray, the guide protrusion being configured to move within the guide grooves.

9. The disk player of claim 8, further including a pair of through holes formed in the disk tray, the through holes being positioned adjacent one end of each of the guide grooves and being dimensioned to receive a respective one of the guide protrusions.

10. The disk player of claim 5, wherein the rack further includes a locking protrusion, the locking protrusion being slidably positioned within an insertion hole formed in the disk tray, wherein the lever member prevents movement of the locking protrusion along the insertion hole.

11. The disk player of claim 10, wherein the chuck holder includes an engagement protrusion positioned to engage the locking protrusion, the locking protrusion preventing movement of the chuck holder from its first position to its second position when the lever member is positioned to lock the rack member to the disk tray.

12. The disk player of claim 11, further including an abutment member positioned on the housing, the abutment member being positioned to engage the lever member and release the rack from the disk tray, wherein when the rack is released from the disk tray, the rack is movable relative to the disk tray to disengage the engagement protrusion and the locking protrusion to permit the chuck holder to move from its first position to its second position.

\* \* \* \* \*